(12) United States Patent
Hsu

(10) Patent No.: US 11,093,434 B2
(45) Date of Patent: Aug. 17, 2021

(54) COMMUNICATION SYSTEM AND OPERATION METHOD

(71) Applicant: Realtek Semiconductor Corporation, Hsinchu (TW)

(72) Inventor: Fu-Ching Hsu, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 16/867,658

(22) Filed: May 6, 2020

(65) Prior Publication Data

US 2021/0124709 A1    Apr. 29, 2021

(30) Foreign Application Priority Data

Oct. 24, 2019   (TW) .................................. 108138476

(51) Int. Cl.
*G06F 13/42* (2006.01)
*G06F 13/28* (2006.01)

(52) U.S. Cl.
CPC ........ *G06F 13/4291* (2013.01); *G06F 13/287* (2013.01); *G06F 2213/0032* (2013.01)

(58) Field of Classification Search
CPC ............... G06F 13/4291; G06F 13/287; G06F 2213/0032
See application file for complete search history.

(56) References Cited

U.S. PATENT DOCUMENTS

| | | | | |
|---|---|---|---|---|
| 6,829,663 | B1 * | 12/2004 | Ghaffari | G06F 13/385 710/65 |
| 7,076,569 | B1 * | 7/2006 | Bailey | H04L 69/12 709/212 |
| 7,903,497 | B2 | 3/2011 | Terzioglu et al. | |
| 8,275,925 | B2 * | 9/2012 | Day | G06F 13/387 710/308 |
| 8,868,806 | B2 * | 10/2014 | Singh | G06F 13/28 710/74 |
| 8,924,610 | B1 * | 12/2014 | Carr | G06F 3/0659 710/74 |
| 2007/0136521 | A1 * | 6/2007 | Voorhees | G06F 3/0671 711/112 |
| 2009/0300259 | A1 * | 12/2009 | Luo | G06F 13/385 710/313 |
| 2015/0261442 | A1 * | 9/2015 | Haywood | G11C 7/1072 711/103 |
| 2018/0203772 | A1 | 7/2018 | Matsuo | |
| 2019/0205037 | A1 | 7/2019 | Lee et al. | |

* cited by examiner

*Primary Examiner* — Glenn A. Auve
(74) *Attorney, Agent, or Firm* — Locke Lord LLP; Tim Tingkang Xia, Esq.

(57) ABSTRACT

A communication system includes a physical layer circuit, a link layer circuit, a transport layer circuit, and a memory circuit. The physical layer circuit is coupled to a first storage circuit. The link layer circuit is coupled to the physical layer circuit. The transport layer circuit is coupled to a second storage circuit. The memory circuit is coupled between the link layer circuit and the transport layer circuit. The memory circuit includes a memory. The memory is controlled to selectively transmit data in the second storage circuit to the first storage circuit, or transmit data in the first storage circuit to the second storage circuit.

20 Claims, 3 Drawing Sheets

COMMUNICATION SYSTEM AND OPERATION METHOD

RELATED APPLICATIONS

This application claims priority to Taiwanese Application Serial Number 108138476, filed Oct. 24, 2019, which is herein incorporated by reference.

BACKGROUND

Technical Field

The present disclosure relates to a communication structure. More particularly, the present disclosure relates to a communication system and an operation method.

Description of Related Art

Communication technology is utilized to transmit signals between two devices. However, in some related approaches, multiple memories are arranged in a communication system to perform a transmission process and a receiving process. In these related approaches, the circuit area is large and the cost is high.

SUMMARY

One embodiment of the present disclosure is related to a communication system suitable for Serial Advanced Technology Attachment (SATA). The communication system includes a physical layer circuit, a link layer circuit, a transport layer circuit, and a memory circuit. The physical layer circuit is configured to couple a first storage circuit. The link layer circuit is coupled to the physical layer circuit. The transport layer circuit is configured to couple a second storage circuit. The memory circuit is coupled between the link layer circuit and the transport layer circuit. The memory circuit includes a memory. The memory is controlled to selectively transmit data in the second storage circuit to the first storage circuit, or transmit data in the first storage circuit to the second storage circuit.

One embodiment of the present disclosure is related to an operation method of a communication system suitable for SATA. The operation method includes the following steps: generating, by a memory access circuit, a selection signal, in which the selection signal has a first state or a second state; when the selection signal has the second state, transmitting, by a memory of a memory circuit, data in a first storage circuit to a second storage circuit; and when the selection signal has the first state, transmitting, by the memory, data in the second storage circuit to the first storage circuit.

Based on the description above, the communication system of the present disclosure can realize the transmission process and the receiving process by a single memory, to shrink the circuit area and decrease the cost.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
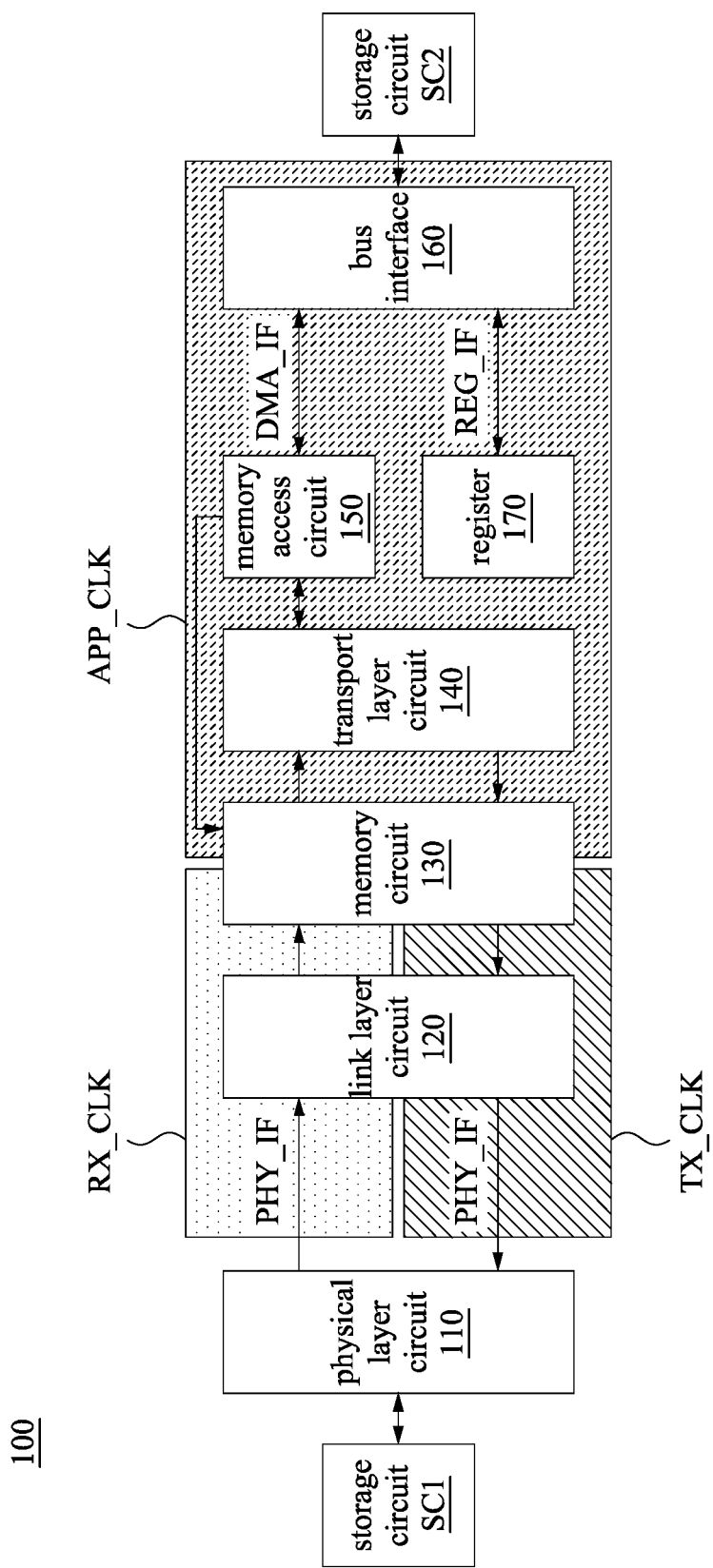
FIG. 1 is a schematic diagram illustrating a communication system according to some embodiments of the present disclosure.

Reference is now made in detail to the present embodiments of the disclosure, examples of which are illustrated in the accompanying drawings. Wherever possible, the same reference numbers are used in the drawings and the description to refer to the same or like parts. The embodiments below are described in detail with the accompanying drawings, but the examples provided are not intended to limit the scope of the disclosure covered by the description. The structure and operation are not intended to limit the execution order. Any structure regrouped by elements, which has an equal effect, is covered by the scope of the present disclosure.

In the present disclosure, "connected" or "coupled" may be referred to "electrically connected" or "electrically coupled." "Connected" or "coupled" may also be referred to operations or actions between two or more elements.

Reference is made to FIG. 1. FIG. 1 is a schematic diagram illustrating a communication system 100 according to some embodiments of the present disclosure. In some embodiments, the communication system 100 is applied to Serial Advanced Technology Attachment (SATA) technology, but the present disclosure is not limited thereto.

As illustrated in FIG. 1, the communication system 100 includes a physical layer circuit 110, a link layer circuit 120, a memory circuit 130, a transport layer circuit 140, a memory access circuit 150, a bus interface 160, and a register 170.

The physical layer circuit 110 is configured to be coupled to a storage circuit SC1. In some embodiments, the storage circuit SC1 is a hard disk, but the present disclosure is not limited thereto. The link layer circuit 120 is coupled to the physical layer circuit 110 via two physical layer interfaces PHY_IF. The memory circuit 130 is coupled between the link layer circuit 120 and the transport layer circuit 140. The transport layer circuit 140 is coupled to the memory access circuit 150. In some embodiments, the memory access circuit 150 is implemented by a direct memory access (DMA) control circuit, but the present disclosure is not limited thereto. The memory access circuit 150 is coupled to the memory circuit 130. The memory access circuit 150 is coupled to the bus interface 160 via a direct memory access interface DMA_IF. The bus interface 160 is coupled to the register 170 via a register interface REG_IF. The bus interface 160 is configured to be coupled to a storage circuit SC2. In some embodiments, the storage circuit SC2 is a dynamic random access memory (DRAM) or a flash memory, but the present disclosure is not limited thereto.

In some embodiments, the link layer circuit 120, the memory circuit 130, the transport layer circuit 140, the memory access circuit 150, the bus interface 160, and the register 170 operate in a media access control (MAC) structure. When the communication system 100 operates in a transmission mode, the link layer circuit 120 operates according to a transmission clock signal TX_CLK. When the communication system 100 operates in a receiving mode, the link layer circuit 120 operates according to a receiving clock signal RX_CLK. The transport layer circuit 140, the memory access circuit 150, the bus interface 160, and the register 170 operate according to an application clock signal APP_CLK.

Figure 2:
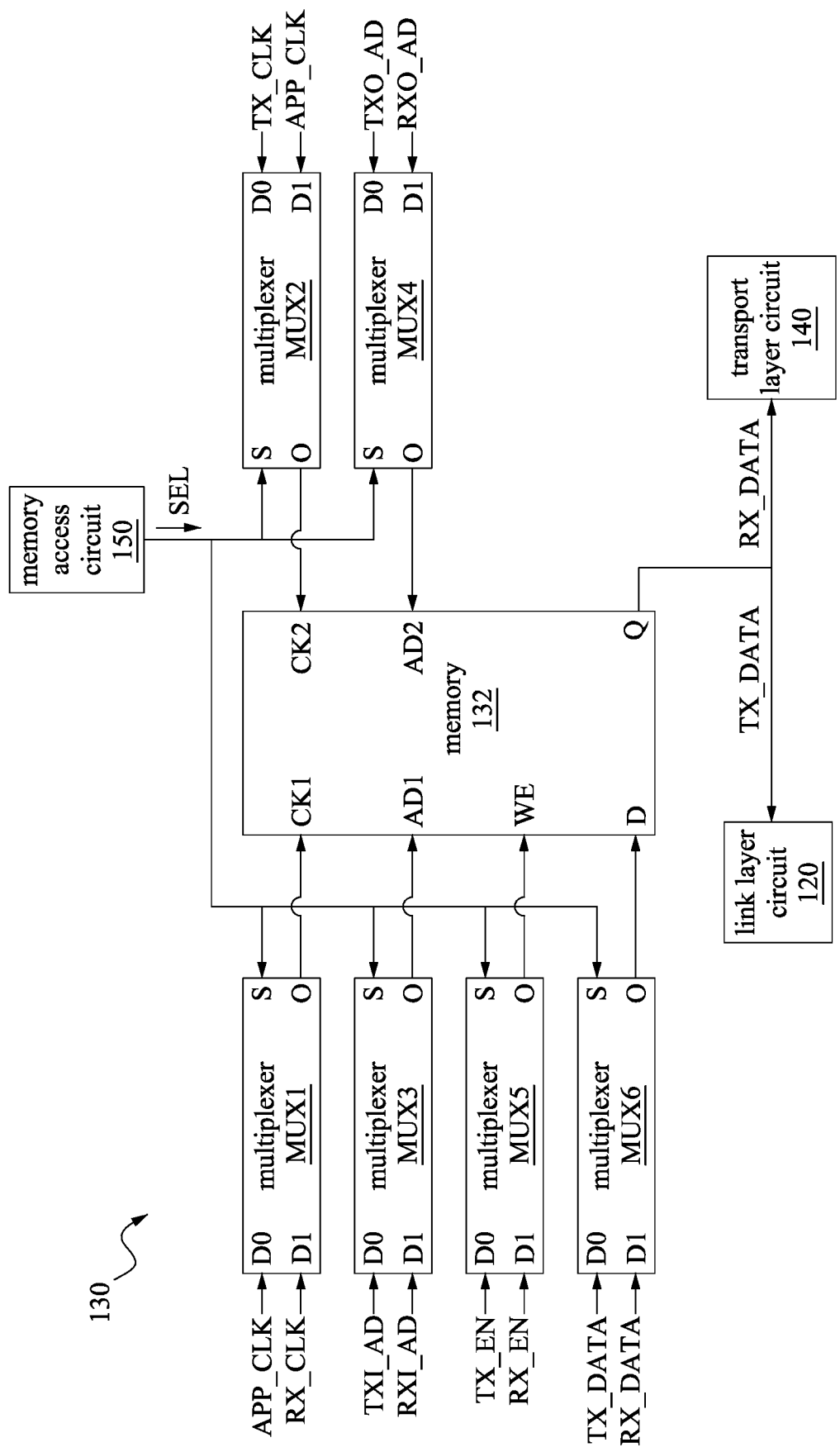
FIG. 2 is a schematic diagram illustrating the link layer circuit, the memory circuit, the transport layer circuit, and the memory access circuit in FIG. 1 according to some embodiments of the present disclosure.

References are made to FIG. 1 and FIG. 2. FIG. 2 is a schematic diagram illustrating the link layer circuit 120, the memory circuit 130, the transport layer circuit 140, and the memory access circuit 150 in FIG. 1 according to some embodiments of the present disclosure.

The memory circuit 130 includes a memory 132 and multiplexers MUX1-MUX6. In some embodiments, the memory 132 is implemented by a static random access memory (SRAM), but the present disclosure is not limited thereto.

The memory access circuit 150 is configured to generate a selection signal SEL according to an operation mode of the communication system 100. In some embodiments, the selection signal SEL has two states (for example, a logic value of 0 and a logic value of 1). The logic value of 0 is corresponding to the transmission mode and the logic value of 1 is corresponding to the receiving mode. In some embodiments, the selection signal SEL may be preset to be the logic value of 0.

When the communication system 100 operates in the transmission mode, the selection signal SEL has the logic value of 0. The multiplexers MUX1-MUX6 control the memory 132 to transmit data in the storage circuit SC2 to the storage circuit SC1 according to the selection signal SEL having the logic value of 0. When the communication system 100 operates in the receiving mode, the selection signal SEL has the logic value of 1. The multiplexers MUX1-MUX6 control the memory 132 to transmit data in the storage circuit SC1 to the storage circuit SC2 according to the selection signal SEL having the logic value of 1.

Each of the multiplexers MUX1-MUX6 includes an input terminal D0, an input terminal D1, an output terminal O, and a selection terminal S. The memory 132 includes a reading clock port CK1, a writing clock port CK2, an input address port AD1, an output address port AD2, an enabling port WE, a data port D, and an output port Q. In some embodiments, the multiplexers MUX1 and MUX2 are implemented by glitch free clock multiplexers, but the present disclosure is not limited thereto. The glitch free clock multiplexers can avoid spikes of clock signals received at the reading clock port CK1 and the writing clock port CK2 during switching procedure.

The input terminal D0 of the multiplexer MUX1 is configured to receive the application clock signal APP_CLK. The input terminal D1 of the multiplexer MUX1 is configured to receive the receiving clock signal RX_CLK. The output terminal O of the multiplexer MUX1 is coupled to the reading clock port CK1 of the memory 132. The selection terminal S of the multiplexer MUX1 is configured to receive the selection signal SEL.

The input terminal D0 of the multiplexer MUX2 is configured to receive the transmission clock signal TX_CLK. The input terminal D1 of the multiplexer MUX2 is configured to receive the application clock signal APP_CLK. The output terminal O of the multiplexer MUX2 is coupled to the writing clock port CK2 of the memory 132. The selection terminal S of the multiplexer MUX2 is configured to receive the selection signal SEL.

The input terminal D0 of the multiplexer MUX3 is configured to receive a transmission input address TXI_AD. The input terminal D1 of the multiplexer MUX3 is configured to receive a receiving input address RXI_AD. The output terminal O of the multiplexer MUX3 is coupled to the input address port AD1 of the memory 132. The selection terminal S of the multiplexer MUX3 is configured to receive the selection signal SEL.

The input terminal D0 of the multiplexer MUX4 is configured to receive a transmission output address TXO_AD. The input terminal D1 of the multiplexer MUX4 is configured to receive the receiving output address RXO_AD. The output terminal O of the multiplexer MUX4 is coupled to the output address port AD2 of the memory 132. The selection terminal S of the multiplexer MUX4 is configured to receive the selection signal SEL.

The input terminal D0 of the multiplexer MUX5 is configured to receive a transmission enable signal TX_EN. The input terminal D1 of the multiplexer MUX5 is configured to receive a receiving enable signal RX_EN. The output terminal O of the multiplexer MUX5 is coupled to the enabling port WE of the memory 132. The selection terminal S of the multiplexer MUX5 is configured to receive the selection signal SEL.

The input terminal D0 of the multiplexer MUX6 is configured to receive a transmission data TX_DATA. The input terminal D1 of the multiplexer MUX6 is configured to receive receiving data RX_DATA. The output terminal O of the multiplexer MUX6 is coupled to the data port D of the memory 132. The selection terminal S of the multiplexer MUX6 is configured to receive the selection signal SEL.

When the communication system 100 operates in the transmission mode, the transport layer circuit 140 is configured to read data operates according to the application clock signal APP_CLK, and the link layer circuit 120 is configured to write data operates according to the transmission clock signal TX_CLK. Accordingly, when the communication system 100 operates in the transmission mode, the selection signal SEL has the logic value of 0, the multiplexer MUX1 outputs the application clock signal APP_CLK to the reading clock port CK1 of the memory 132 according to the selection signal SEL having the logic value of 0, and the multiplexer MUX2 outputs the transmission clock signal TX_CLK to the writing clock port CK2 of the memory 132 according to the selection signal SEL having the logic value of 0.

The multiplexer MUX3 outputs the transmission input address TXI_AD to the input address port AD1 of the memory 132 according to the selection signal SEL having the logic value of 0. The multiplexer MUX4 outputs the transmission output address TXO_AD to the output address port AD2 of the memory 132 according to the selection signal SEL having the logic value of 0. The multiplexer MUX5 outputs the transmission enable signal TX_EN to the enabling port WE of the memory 132 according to the selection signal SEL having the logic value of 0. The multiplexer MUX6 outputs the transmission data TX_DATA to the data port D of the memory 132 according to the selection signal SEL having the logic value of 0.

Accordingly, based on the transmission enable signal TX_EN received at the enabling port WE, the memory 132 can transmit the transmission data TX_DATA received at the data port D from a block corresponding to the transmission input address TXI_AD of the storage circuit SC2 to the link layer circuit 120 via the output port Q according to the application clock signal APP_CLK received at the reading clock port CK1 and the transmission clock signal TX_CLK received at the writing clock port CK2, to transmit the transmission data TX_DATA to a block corresponding to the transmission output address TXO_AD of the storage circuit SC1 via the physical layer interface PHY_IF and the physical layer circuit 110.

When the communication system 100 operates in the receiving mode, the link layer circuit 120 is configured to read data operates according to the receiving clock signal RX_CLK. The transport layer circuit 140 is configured to write data operates according to the application clock signal APP_CLK. Accordingly, when the communication system 100 operates in the receiving mode, the selection signal SEL has the logic value of 1. The multiplexer MUX1 outputs the receiving clock signal RX_CLK to the reading clock port CK1 of the memory 132 according to the selection signal SEL having the logic value of 1. The multiplexer MUX2 outputs the application clock signal APP_CLK to the writing clock port CK2 of the memory 132 according to the selection signal SEL having the logic value of 1.

The multiplexer MUX3 outputs the receiving input address RXI_AD to the input address port AD1 of the memory 132 according to the selection signal SEL having the logic value of 1. The multiplexer MUX4 outputs the receiving output address RXO_AD to the output address port AD2 of the memory 132 according to the selection signal SEL having the logic value of 1. The multiplexer MUX5 outputs the receiving enable signal RX_EN to the enabling port WE of the memory 132 according to the selection signal SEL having the logic value of 1. The multiplexer MUX6 outputs the receiving data RX_DATA to the data port D of the memory 132 according to the selection signal SEL having the logic value of 1.

Accordingly, based on the receiving enable signal RX_EN received at the enabling port WE, the memory 132 can transmit the receiving data RX_DATA received at the data port D from a block corresponding to the receiving input address RXI_AD of the storage circuit SC1 to the transport layer circuit 140 via the output port Q according to the receiving clock signal RX_CLK received at the reading clock port CK1 and the application clock signal APP_CLK received at the writing clock port CK2, to transmit the receiving data RX_DATA to a block corresponding to the receiving output address RXO_AD of the storage circuit SC2 via the memory access circuit 150, the memory access interface DMA_IF, and the bus interface 160.

Based on operations above, the communication system 100 can utilize the single memory 132 to realize the transmission process and the receiving process. Compared to related approaches of utilizing multiple memories, the present disclosure can shrink the circuit area and reduce the cost.

Figure 3:
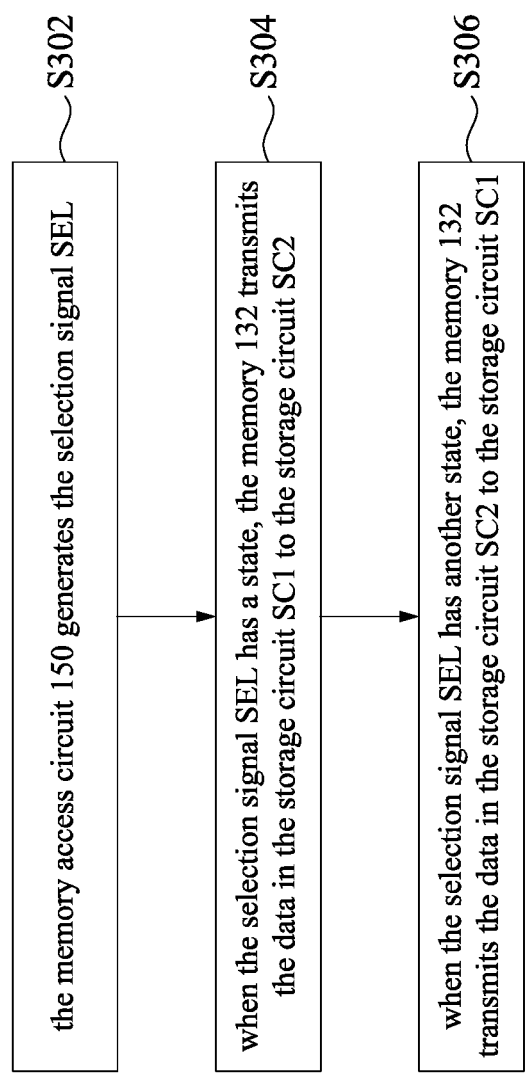
FIG. 3 is a flow diagram illustrating an operation method of a communication system according to some embodiments of the present disclosure.

Reference is made to FIG. 3. FIG. 3 is a flow diagram illustrating an operation method 300 of a communication system according to some embodiments of the present disclosure. The operation method 300 includes operations S302, S304, and S306. In some embodiments, the operation method 300 is applied to the communication system 100 in FIG. 1, but the present disclosure is not limited thereto. For ease of understanding, the operation method 300 is discussed with reference to FIG. 1 and FIG. 2.

In operation S302, the memory access circuit 150 generates the selection signal SEL. In some embodiments, the selection signal SEL has the two states (for example, the logic value of 0 and the logic value of 1). The selection signal SEL is configured to control the multiplexers MUX1-MUX6 of the memory circuit 130, to control the operations of the memory 132 by controlling the multiplexers MUX1-MUX6.

In operation S304, when the selection signal SEL has a state (for example, the logic value of 1), the memory 132 of the memory circuit 130 transmits the data in the storage circuit SC1 to the storage circuit SC2. In some embodiments, the state (for example, the logic value of 1) is corresponding to the receiving mode. In other words, when the communication system 100 operates in the receiving mode, the memory 132 is controlled to transmit the data in the storage circuit SC1 to the storage circuit SC2.

In operation S306, when the selection signal SEL has another state (for example, the logic value of 0), the memory 132 of the memory circuit 130 transmits the data in the storage circuit SC2 to the storage circuit SC1. In some embodiments, the state (for example, the logic value of 0) is corresponding to the transmission mode. In other words, when the communication system 100 operates in the transmission mode, the memory 132 is controlled to transmit the data in the storage circuit SC2 to the storage circuit SC1.

Based on the descriptions above, the communication system of the present disclosure can realize the transmission process and the receiving process by a single memory, to shrink the circuit area and decrease the cost.

Various functional components or blocks have been described herein. As will be appreciated by persons skilled in the art, in some embodiments, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A communication system suitable for Serial Advanced Technology Attachment (SATA) comprising:
   a physical layer circuit configured to be coupled to a first storage circuit;
   a link layer circuit coupled to the physical layer circuit;
   a transport layer circuit configured to be coupled to a second storage circuit; and
   a memory circuit coupled between the link layer circuit and the transport layer circuit, wherein the memory circuit comprises a memory, the memory is configured to be controlled to selectively transmit data in the second storage circuit to the first storage circuit, or transmit data in the first storage circuit to the second storage circuit.

2. The communication system of claim 1, further comprising:
a memory access circuit configured to generate a selection signal, wherein when the communication system operates in a transmission mode, the selection signal has a first state and the memory transmits the data in the second storage circuit to the first storage circuit, wherein when the communication system operates in a receiving mode, the selection signal has a second state and the memory transmits the data in the first storage circuit to the second storage circuit.

3. The communication system of claim 2, wherein when the communication system operates in the transmission mode, the link layer circuit operates according to a transmission clock signal and the transport layer circuit operates according to an application clock signal, wherein when the communication system operates in the receiving mode, the link layer circuit operates according to a receiving clock signal and the transport layer circuit operates according to the application clock signal.

4. The communication system of claim 3, wherein the memory comprises a reading clock port and the memory circuit further comprises:
a multiplexer configured to output the application clock signal or the receiving clock signal to the reading clock port according to the selection signal.

5. The communication system of claim 4, wherein when the communication system operates in the transmission mode, the multiplexer outputs the application clock signal to the reading clock port according to the selection signal, wherein when the communication system operates in the receiving mode, the multiplexer outputs the receiving clock signal to the reading clock port according to the selection signal.

6. The communication system of claim 3, wherein the memory comprises a writing clock port and the memory circuit further comprises:
a multiplexer configured to output the transmission clock signal or the application clock signal to the writing clock port according to the selection signal.

7. The communication system of claim 6, wherein when the communication system operates in the transmission mode, the multiplexer outputs the transmission clock signal to the writing clock port according to the selection signal, wherein when the communication system operates in the receiving mode, the multiplexer outputs the application clock signal to the writing clock port according to the selection signal.

8. The communication system of claim 2, wherein the memory comprises an input address port and the memory circuit further comprises:
a multiplexer configured to output a transmission input address or a receiving input address to the input address port according to the selection signal.

9. The communication system of claim 8, wherein when the communication system operates in the transmission mode, the multiplexer outputs the transmission input address to the input address port according to the selection signal, wherein when the communication system operates in the receiving mode, the multiplexer outputs the receiving input address to the input address port according to the selection signal.

10. The communication system of claim 2, wherein the memory comprises an output address port and the memory circuit further comprises:
a multiplexer configured to output a transmission output address or a receiving output address to the output address port according to the selection signal.

11. The communication system of claim 10, wherein when the communication system operates in the transmission mode, the multiplexer outputs the transmission output address to the output address port according to the selection signal, wherein when the communication system operates in the receiving mode, the multiplexer outputs the receiving output address to the output address port according to the selection signal.

12. The communication system of claim 2, wherein the memory comprises an enabling port and the memory circuit further comprises:
a multiplexer configured to output a transmission enable signal or a receiving enable signal to the enabling port according to the selection signal.

13. The communication system of claim 12, wherein when the communication system operates in the transmission mode, the multiplexer outputs the transmission enable signal to the enabling port according to the selection signal, wherein when the communication system operates in the receiving mode, the multiplexer outputs the receiving enable signal to the enabling port according to the selection signal.

14. The communication system of claim 2, wherein the memory comprises a data port and the memory circuit further comprises:
a multiplexer configured to output transmission data or receiving data to the data port according to the selection signal.

15. The communication system of claim 14, wherein when the communication system operates in the transmission mode, the multiplexer outputs the transmission data to the data port according to the selection signal, wherein when the communication system operates in the receiving mode, the multiplexer outputs the receiving data to the data port according to the selection signal.

16. The communication system of claim 1, wherein the first storage circuit is a hard disk.

17. The communication system of claim 1, wherein the second storage circuit is a DRAM or a flash.

18. An operation method of a communication system suitable for SATA, wherein the operation method comprises:
generating, by a memory access circuit, a selection signal, wherein the selection signal has a first state or a second state;
when the selection signal has the second state, transmitting, by a memory of a memory circuit, data in a first storage circuit to a second storage circuit; and
when the selection signal has the first state, transmitting, by the memory, data in the second storage circuit to the first storage circuit,
wherein the memory of the memory circuit operates according to a plurality of clock signals.

19. The operation method of claim 18, wherein the first state is corresponding to a transmission mode and the second state is corresponding to a receiving mode.

20. The operation method of claim 18, wherein the selection signal is configured to control a plurality of multiplexers of the memory circuit, to control operations of the memory by controlling the multiplexers.

* * * * *